US 6,742,679 B2

(12) United States Patent  (10) Patent No.: US 6,742,679 B2
Martin  (45) Date of Patent: Jun. 1, 2004

(54) DROP PLATE FEEDER

(76) Inventor: Albert Ray Martin, 10 Windsor Ct., Lufkin, TX (US) 75901

(*) Notice: Subject to any disclaimer, the term of this patent is extended or adjusted under 35 U.S.C. 154(b) by 51 days.

(21) Appl. No.: 10/275,924
(22) PCT Filed: Jun. 3, 2002
(86) PCT No.: PCT/US02/17630
§ 371 (c)(1), (2), (4) Date: Nov. 7, 2002
(87) PCT Pub. No.: WO02/100742
PCT Pub. Date: Dec. 19, 2002

(65) Prior Publication Data
US 2004/0047695 A1 Mar. 11, 2004

(51) Int. Cl.7 ................................. B67D 3/00
(52) U.S. Cl. ................ 222/504; 222/168; 406/52; 406/128; 406/135
(58) Field of Search ............... 198/532; 406/50, 406/52, 70, 128, 135; 222/504, 168

(56) References Cited

U.S. PATENT DOCUMENTS

| | | | |
|---|---|---|---|
| 1,679,398 A | 8/1928 | Bonnot | |
| 1,993,249 A | 3/1935 | Scholz | 88/44 |
| 2,213,508 A | 9/1940 | Wheldon | 221/125 |
| 2,329,948 A | 9/1943 | Shallock | 221/125 |
| 3,437,384 A | * 4/1969 | Bozich | 406/124 |
| 3,820,688 A | 6/1974 | Weiste | 222/193 |
| 4,227,835 A | 10/1980 | Nussbaum | 406/52 |
| 4,436,458 A | * 3/1984 | Wisdom et al. | 406/135 |
| 4,746,250 A | * 5/1988 | Schoppe | 406/63 |
| 4,789,569 A | 12/1988 | Douche et al. | 427/421 |
| 4,921,149 A | * 5/1990 | Miller et al. | 222/639 |
| 5,104,230 A | 4/1992 | Douche et al. | 366/156 |
| 6,079,911 A | * 6/2000 | Wangermann et al. | 406/132 |
| 6,416,261 B2 | 7/2002 | Martin | 406/128 |

* cited by examiner

Primary Examiner—Joe Dillon, Jr.
(74) Attorney, Agent, or Firm—E. W. Alworth

(57) ABSTRACT

A rotary plate feeder valve for use in pressurized pneumatic conveying systems. The valve comprises a rotary plate that is fed from a central inlet and discharges through a central outlet located immediately below the inlet. Located over the outlet discharge and within the valve body is a feed-rate control cone. Material transfer is controlled by rotary speed and feed-rate cone position. Several embodiments of the valve are disclosed including a "live-bottom" embodiment designed to reduce or eliminate bridging in silos. Due to high clearances within the valve, the valve may be used with abrasive materials, delicate materials and foodstuffs.

20 Claims, 13 Drawing Sheets

DROP PLATE FEEDER

TECHNICAL FIELD

The present invention relates generally to solids handling and in particular to feeder valves, having little or no air loss, used in pneumatic conveying systems.

BACKGROUND ART

In pneumatic conveying solid materials (powder, sand, gravel, coal, and the like as well as agricultural products such as seed and foodstuffs) must be moved from a storage facility be it a silo, a bin, a bunker, or similar, into a pneumatic conveying system. The storage facility is generally at atmospheric pressure; whereas, the conveying system is at a different pressure. Generally, the pneumatic system is at a higher pressure, but there are some vacuum pneumatic conveying systems. The conveying system pressure must be isolated from the storage hopper (bin, silo, etc.), and an airlock type valve is generally used for this purpose.

The airlock valve can take several forms. In some systems, the valve can be a simple gate or ball valve, which opens when the conveying system is de-pressured. This allows material to enter the conveying system. The valve is closed, the system pressured, and the material conveyed. This type of system is a batch process system and cannot deliver material at continuous rate.

In order to deliver material at a continuous rate, the conveying system must remain pressured at all times. Thus, in a continuous system, the airlock valve must be capable of delivering material from the hopper and into the system while maintaining system pressure. Finally, in continuous systems, the operator generally wishes to deliver a certain rate of material over time. Thus, the airlock valve should be capable of "metering" the material from the hopper.

The past art has generally employed a "star-valve" that obtains its name from the valve internals, which are shaped like a star. The star is formed about a shaft and is rotated within a circular valve body. The valve internals are a series of circular open sectors starting at the shaft and extending towards the circular wall of the valve body. The width of the sectors is set by the width of the valve body. The valve is placed between the hopper and the pneumatic conveying system. Material enters at the top of the valve and exits at the bottom of the valve. Essentially, material falls, under gravity, from the hopper into a sector, the sector rotates, and the material falls into the conveying system. Each sector within the star feeder valve acts like an airlock. The rate of material injection into the conveying system is determined by the speed of rotation of the star valve.

In order to create "airlock" properties, the stars (or open sectors) must have extremely tight clearances to and between the internal valve body. Basically, the sectors rub against the valve body walls at all times. Because the sectors rub against the walls, material within the sectors experiences grinding or damage. Furthermore, abrasive materials, such as sand, alumna, and the like, will grind the sectors eventually reducing the airlock properties of the valve. Unfortunately, some materials are capable of packing or clumping when exposed to work as exerted by a rotating star valve. These materials often seize a star valve causing damage to the drive motor and valve internals.

Finally, even though the star valve has 'airlock' properties, it is not an efficient airlock. Each sector, as it rotates from the conveying side pressure to the atmospheric side pressure, must equalize in pressure. Thus, air is transferred from the conveying system to the atmosphere (in a pressure system) or from the atmosphere to the conveying system (in a vacuum system). In fact, many star valves incorporate a special venting system, which allows such transfer to occur externally to the valve.

Rotary plate valves may also be used to transfer material from a hopper to a process and are well known in the art. These valves do not grind the material, nor do they suffer the drawbacks of abrasion or binding found in the star feeder. The rotary plate valve consists of a rotating plate upon which material falls and a plow or scrapper. The plow moves across the plate and scraps material from the plate into a discharge port or opening within the valve. The depth of the plow and the speed of the rotating plate control the rate of transfer through the valve. However, the current art in rotary plate valves does not extend to pressure conveying systems. There are some rotary plate feeder valves that may be used under pressure, but as will be seen these are somewhat limited in their application. Specific examples of the prior art may be found in the following series of U.S. patents.

Bonnot, U.S. Pat. No. 1,679,398, discloses a Disk Feeder for use in the coal industry and is probably one of the earlier disk feeders. Coal (or a similar material) is fed from an offset hopper onto a rotating disk and a scrapper blade removes the coal from the disk. The offset hopper barely touches the rotating disk and has a hole cut on one side of the hopper that allows material to fall onto the disk. A rotary sleeve valve rotates about the hopper and adjusts the amount of material falling onto the hopper. The scrapper blade is fixed. This early apparatus was designed solely for use in an atmospheric pressure environment.

Scholz, U.S. Pat. No. 1,993,249, discloses a Fine Coal Feeder that is a variation of Bonnot. Scholz places a hopper over a rotating disk, and the eccentricity of the hopper may be varied from zero eccentricity (i.e., over the center of the disk) to maximum eccentricity (at the edge of the disk). The eccentricity adjustment provides adjustment of "feed" to the system. Coal is then scrapped from the disk into a downcorner and into the place of use (in this case a boiler). Again, this device was designed for use at atmospheric pressure.

Wheldon, U.S. Pat. No. 2,213,508, discloses a Feeder for Pulverulent Material. Wheldon places a hopper over the center of a rotating disk. The hopper has an opening in the side next to the rotating disk, and an adjustable "scraper" extends through the opening. The scrapper is hinged at one end and may swing into the hopper or line up against the wall of the hopper. In the later position, no material feeds from the system. As the scrapper is positioned into the hopper, material is caused to flow from the hopper, across the disk and onto a conveyor belt. Once more this device was designed for atmospheric pressure.

Shallock, U.S. Pat. No. 2,329,948, discloses a Feeder Means that is similar to Wheldon in that a hopper is placed over the center of the rotating disk. The means for controlling the removal of material is quite different and uses a triangular shaped extension inside the hopper that is in contact with the disk. The extension serves to hold a wedge valve that allows material to flow from the hopper onto the disk and serves also scrap the material from the disk. (Essentially the triangular extension serves two consecutive purposes. Material then follows the extension and drops from the disk into the process. This device was also designed for atmospheric pressure.

Weiste, U.S. Pat. No. 3,820,688, discloses a Material Dosaging Apparatus that is designed for use in pneumatic systems. The apparatus is designed to mix different amounts of material (up to four) into a common stream for conveying. Weiste uses a modified disk in the form of a tub with an outside wall and a center conical section with an opening. An ejector is placed immediately above the opening through which pneumatic conveying air is passed. The ejector causes a partial vacuum, which draws material from the rotating tub into the conveying system. Material falls onto the tub from circular supply hoppers through a form of gate valve. The gate valves regulate the-quantity of material falling onto the rotating tub and consequently into the conveying system. The individual hoppers are vented to atmospheric pressure and atmospheric air is permitted to flow through the hoppers to assure movement of material from the hopper. It is apparent that the design requires the supply hoppers to be at atmospheric pressure and that material is "sucked" into the conveying system.

Nussbaum, U.S. Pat. No. 4,227,835, discloses an Apparatus for the Metered Supply of Powder to a Power Processing Unit that is designed to operate independently of atmospheric pressure. This device uses a rotating disk with a groove machined into the plate. A hopper, which is in tight direct contact with the moving disk, drops power into the groove on the disk. The powder moves around in the groove and is sucked from the groove by a suction device. The groove and the hopper may be operated up to 3.5 bars. Power is metered by two techniques. The first is a "doctor" member located at the hopper that is designed to pass a specific fixed amount of powder onto (or into) the groove. The second uses rotation of the disk that sets the quantity of power that may be draw up by the suction device. This device, although capable of operation at pressure, depends on very close tolerances and would suffer considerable wear when used with abrasive materials. Furthermore, the unit would not work well with loose (corn chips) material.

Douche et al, U.S. Pat. Nos. 4,789,569 and 5,104,230 disclose a Process and Device for Metering Pulverulent Materials. This device is similar to the device of Nussbaum in that a disk with a metering groove is utilized. A "doctor" is not used with the hopper that operates at atmospheric pressure. A series of pads extends from the hopper and wipe excess material from the plate so that only the groove is filled with material. A suction device then picks up the metered material. The device suffers from similar drawbacks, as does the Nussbaum device.

The Nussbaum and Douche devices rely on vacuum pickup of the metered material. In normal pneumatic operations, both sides of the conveying system can operate at pressures greater than atmospheric pressure. None of the devices in the prior art disclose a metering system that will operate at pressure in a pneumatic conveying system. The present inventor (Martin) has disclosed in an earlier U.S. Patent Application (Ser. No. 09/744,156 having a priority date of Jan. 30, 2001 and claiming benefit of an earlier U.S. Provisional Application filed Jan. 31, 2000) a feeder valve that will act as an airlock valve with a variable injection rate while not grinding or sheering the material that is being conveyed or injected into the conveying system. Additionally, the Martin disclosure shows a feeder valve that will reduce or even eliminate the possibility of material buildup and binding within the valve internals.

All flat plate rotary feeder valves suffer one major disadvantage: that disadvantage being a piping offset between the inlet port and outlet port. This disadvantage is generally of little consequence in a new installation, because the designer may adjust the piping layout as required by the valve. In a retrofit application, where a star-valve is being directly replaced by a rotary plate valve, the disadvantage causes many problems. The major problem is moving previously installed piping to accommodate the offset—rotary star valves do not have an offset.

Thus, there still remains a need for a rotary feeder valve that will offer all the advantages of the offset rotary plate feeder valve, BUT without the offset.

DISCLOSURE OF THE INVENTION

The overall object of the present invention is to provide a feeder valve that does not suffer the disadvantages of the rotary star or groove feeder valve nor the offset disadvantage of a flat plate rotary feeder valve. The instant feeder valve is essentially an inclined or bent plate rotary feeder valve, with a perimeter seal extending about the top circumference that keeps material from entering the valve casing. In one embodiment the inclined rotary plate sits directly on a circular bearing that acts as a bottom seal; whereas in other embodiments the inclined plate is supported by angled bearings. The rotating plate is driven by a speed controlled motor external to the valve through a gear arrangement within the valve casing. The shaft connecting the motor to the gears is sealed so that the casing may be pressured.

Material falls through the inlet port, centered at the top of the valve, onto the rotary plate. A internal moveable cone controls the flow of material from the plate through the valve and onto the outlet port centered at the bottom of the valve. The cone moves up to allow more material through the valve or down to shut of flow of material. The position of the cone may be controlled by a hydraulic, pneumatic, or electric actuator placed under the cone and within the valve casing, or by a lever system that places the actuator outside the valve casing. Additionally, the inclined rotary plate may have groves formed within its surface that interact with baffles attached to the upper casing so that sticky material is swept from the plate and through the valve.

In normal use, both the valve internals and the storage hopper (bin, silo, or the like) is maintained at the conveying system pressure by pressure means attached to the storage facility that follows the conveying system pressure. It is possible to keep the hopper at atmospheric pressure and the discharge port at a much higher pressure. This would require a backup shutdown valve that would prevent backflow, if the hopper ran out of material. The backup shutdown valve would be placed on the outlet side of the discharge port.

The valve is manufactured so that different flanges may be mated to the valve body; thus satisfying many sizes of pipe and flange with a given minimum number of valve bodies. Finally, the casing of the valve has an upper half and a lower half which may readily be separated for maintenance of valve internals and the like.

A further embodiment enlarges the rotary valve and places the rotary plate of the valve in the bottom of a storage silo taking up most if not all of the bottom of the silo; thereby, providing a "live-bottom" silo. The "live-bottom" embodiment imparts motion to the contents of the silo thereby reducing or eliminating the tendency of materials to bridge (not flow) within a silo.

MODES FOR CARRYING OUT THE INVENTION

Figure 1:
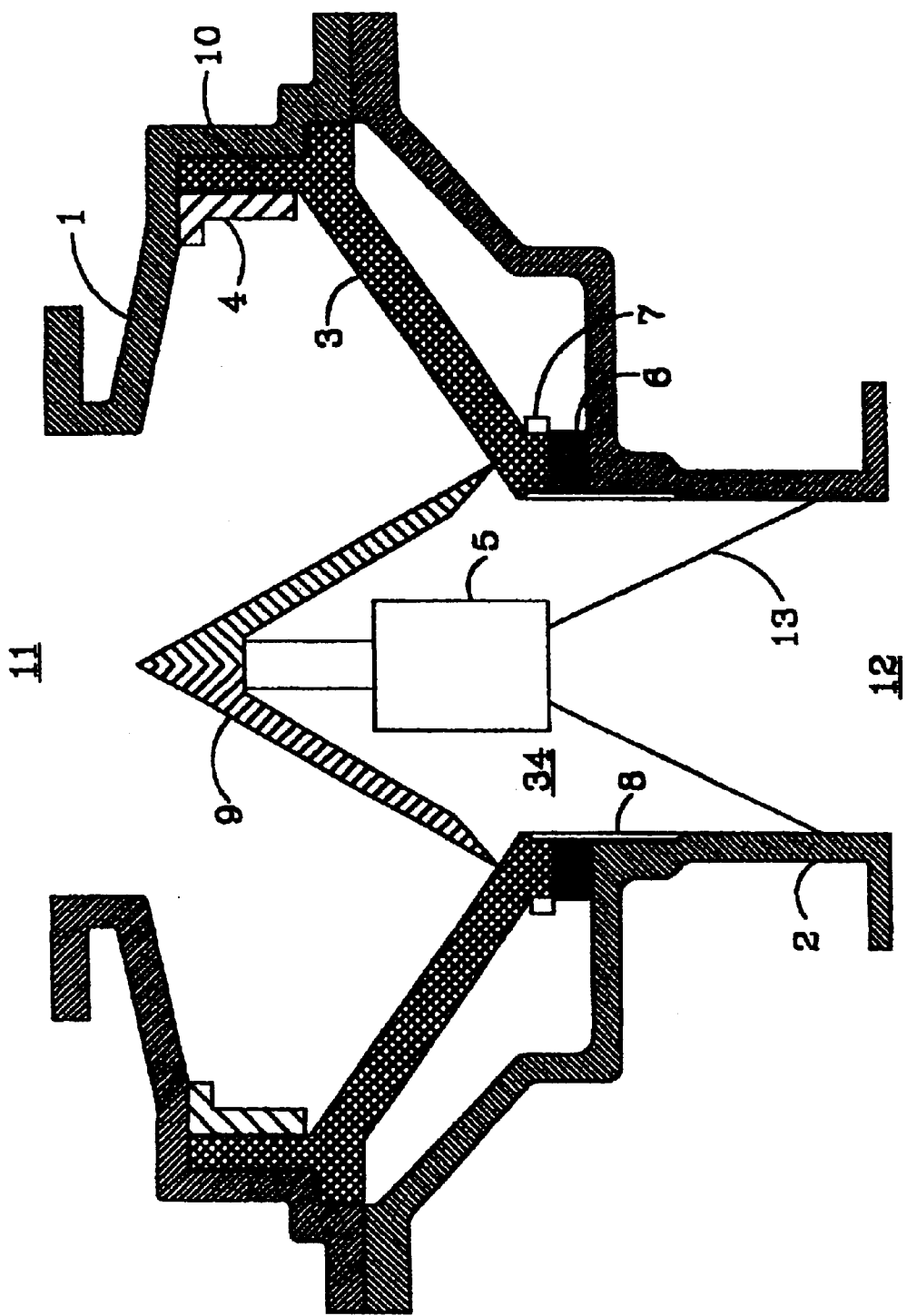
FIG. 1 is a simplified side view of the first embodiment of the instant invention showing an internally actuated cone.
Figure 2:
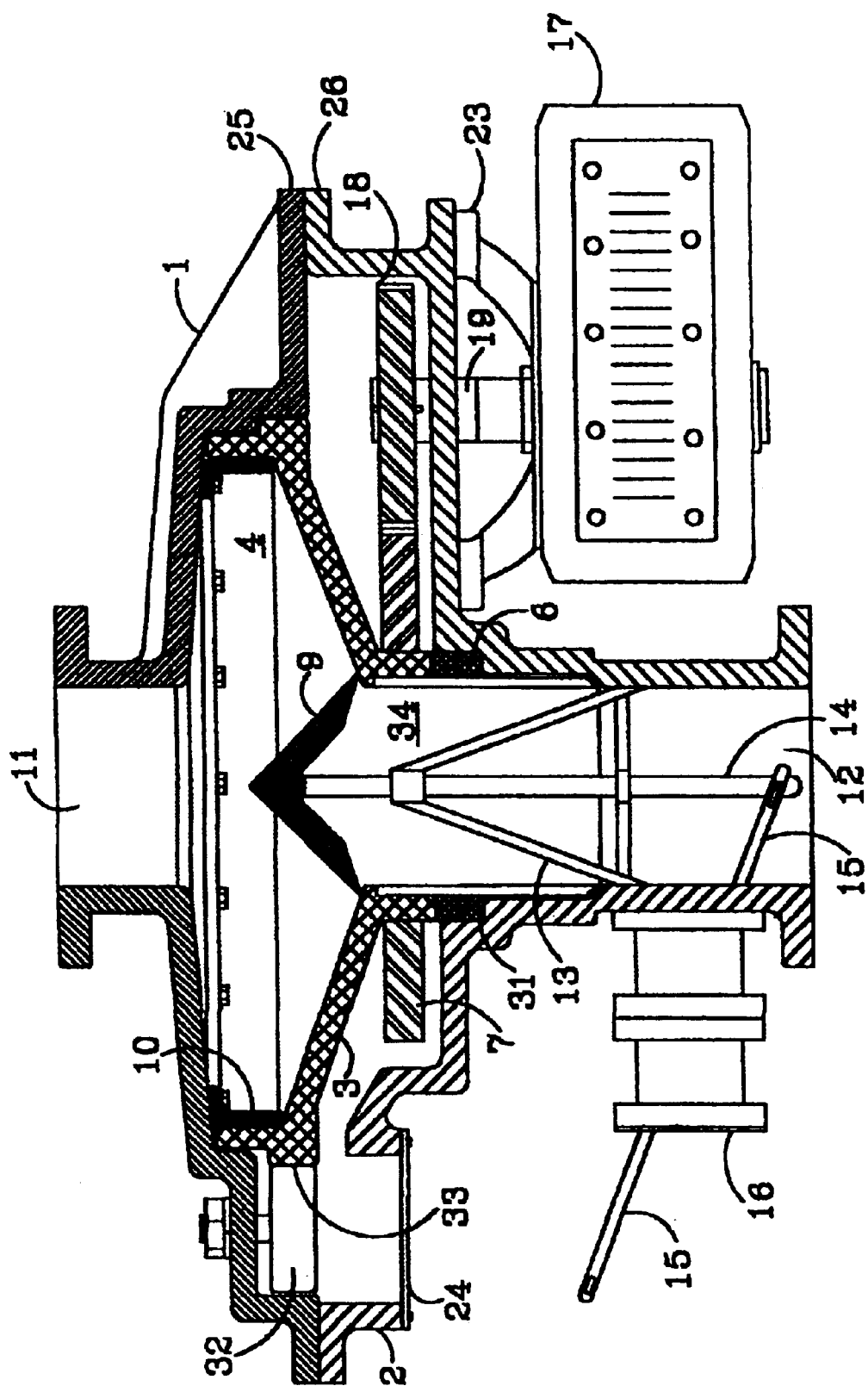
FIG. 2 is a simplified side view of the first embodiment of the instant invention showing the preferred externally actuated cone.
Figure 3:
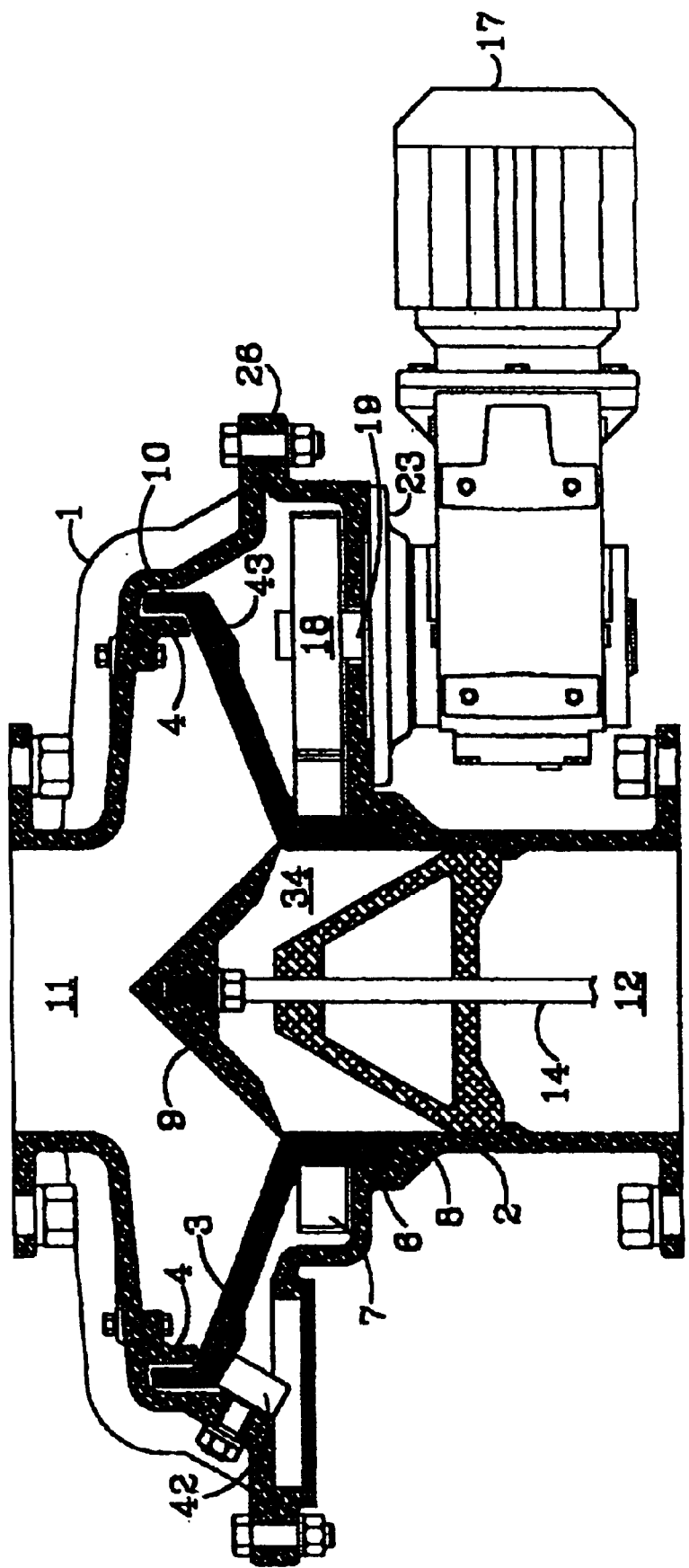
FIG. 3 is a simplified side view of the second embodiment of the instant invention in which the inclined plate is supported by inclined bearings.
Figure 4:
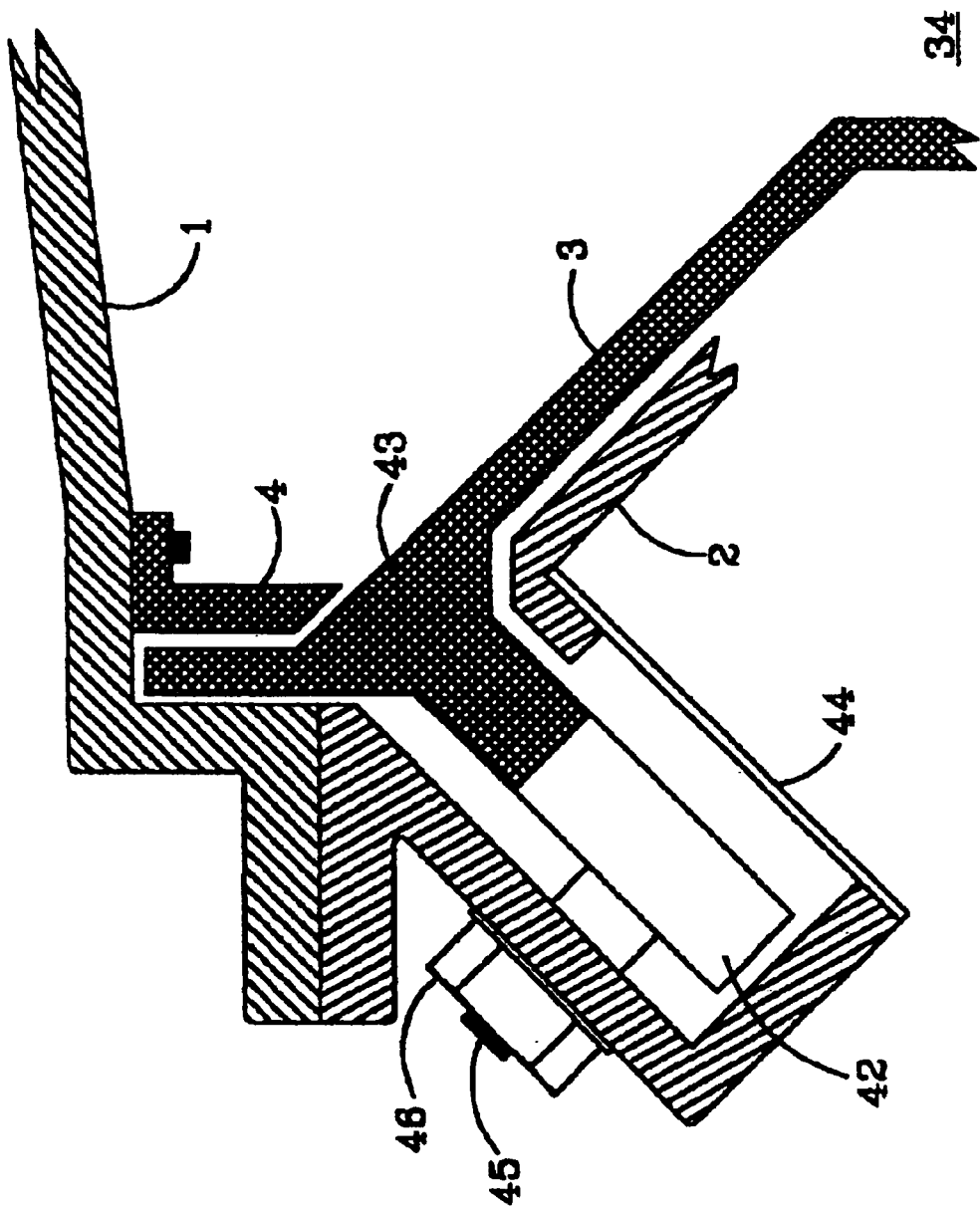
FIG. 4 details the inclined bearings of FIG. 3.
Figure 5:
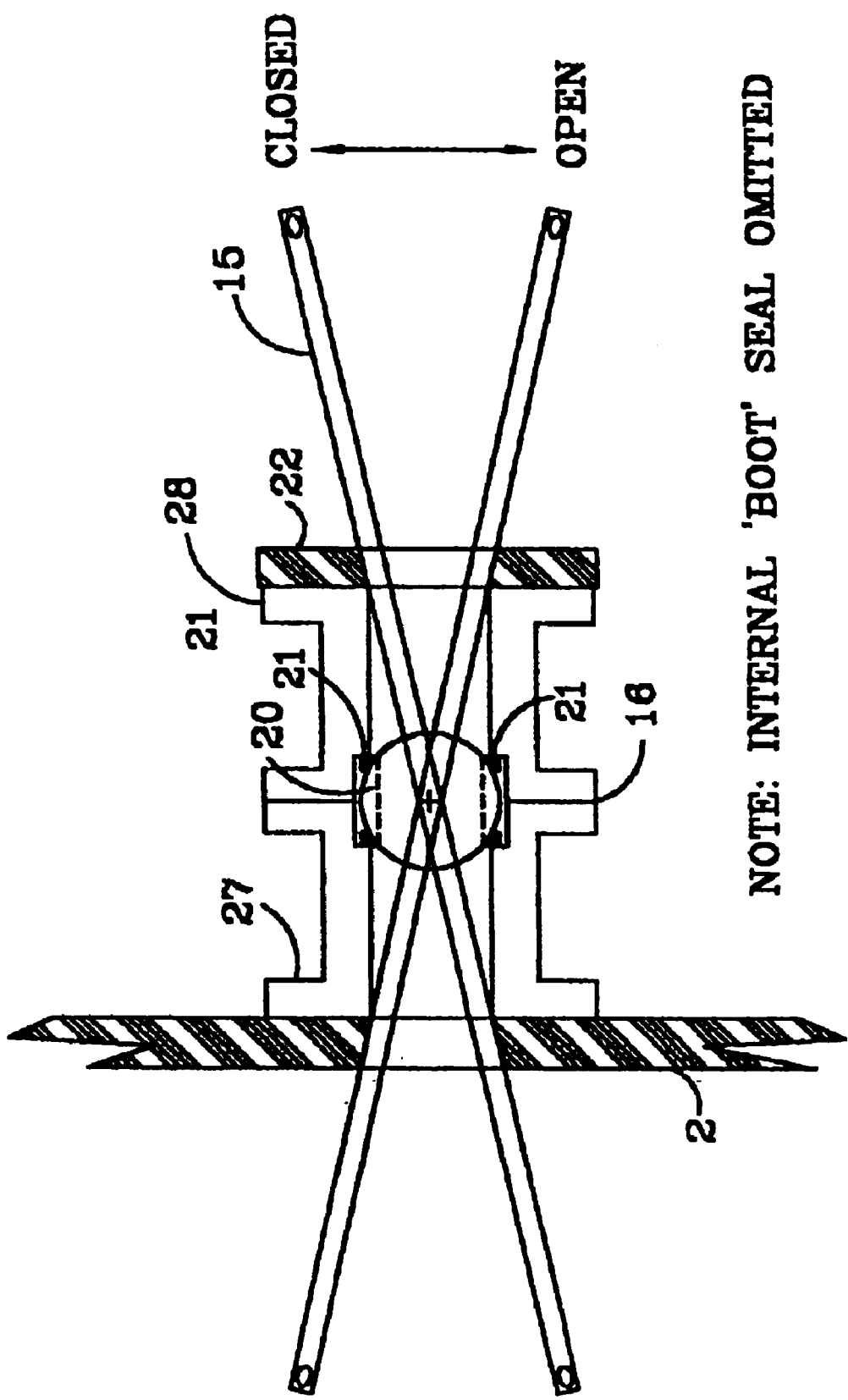
FIG. 5 is a simplified side view of the prototype (first) embodiment of the ball seal and pivot used to operate the cone by an external actuator.
Figure 6:
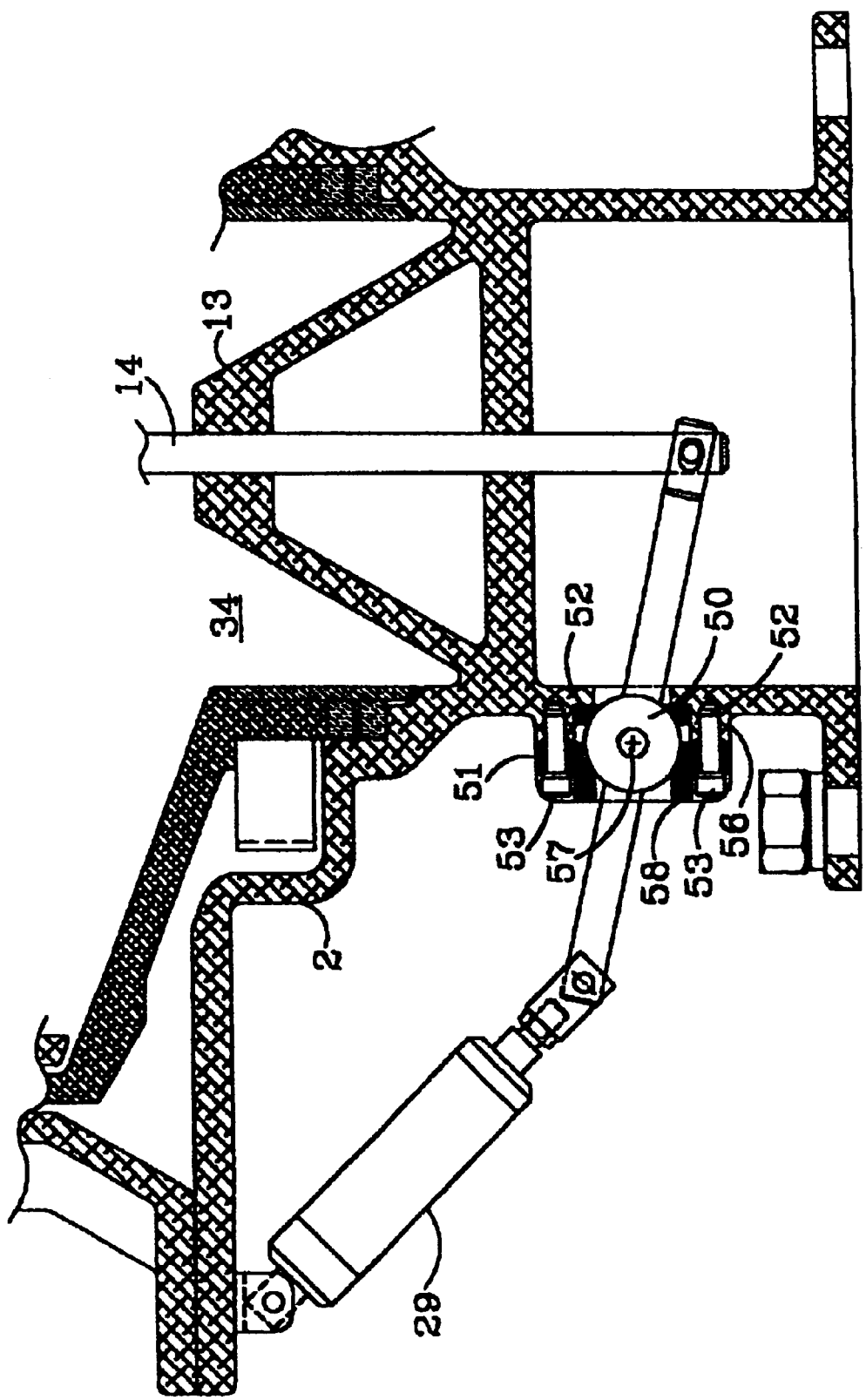
FIG. 6 is a simplified side view of the preferred (second) embodiment of the ball seal and pivot used to operate the cone showing its operation by an external actuator.
Figure 8:
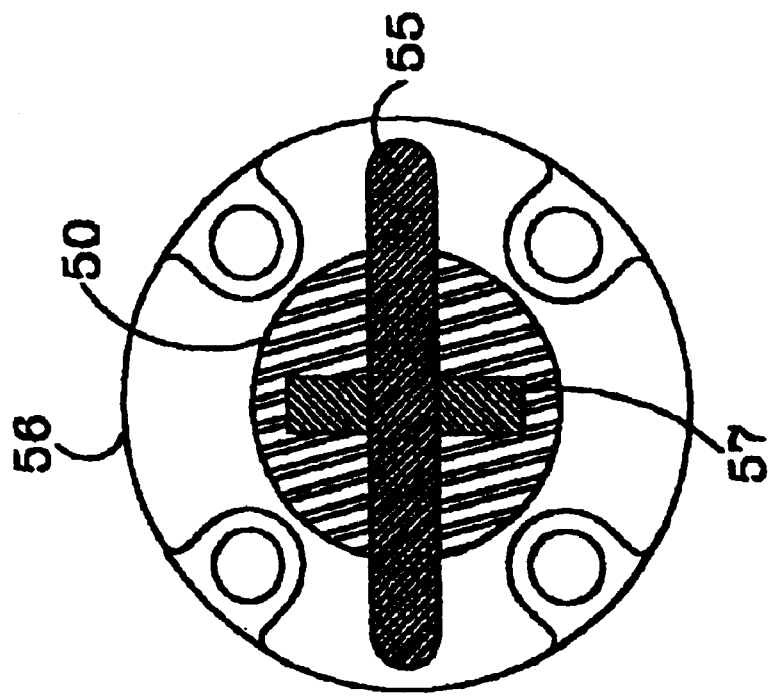
FIG. 8 shows details of the preferred ball seal housing retainer taken looking at the ball holder cast into the lower valve housing.
Figure 7:
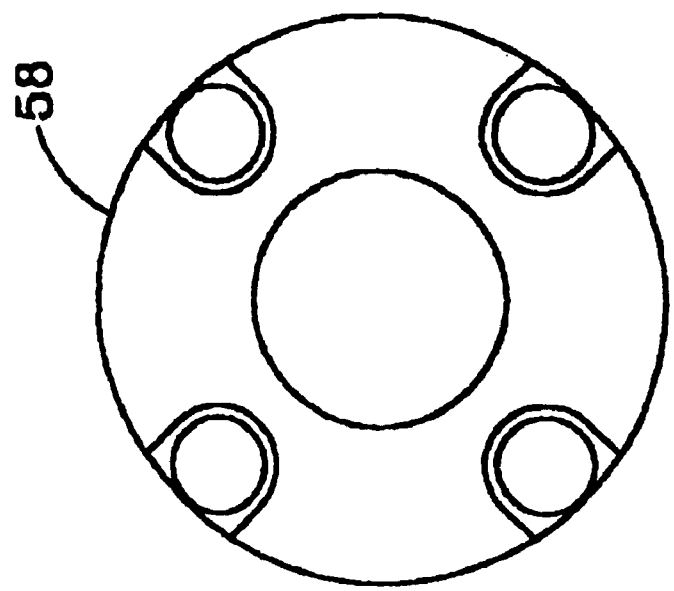
FIG. 7 gives details of the ball seal retainer cover.
Figure 9:
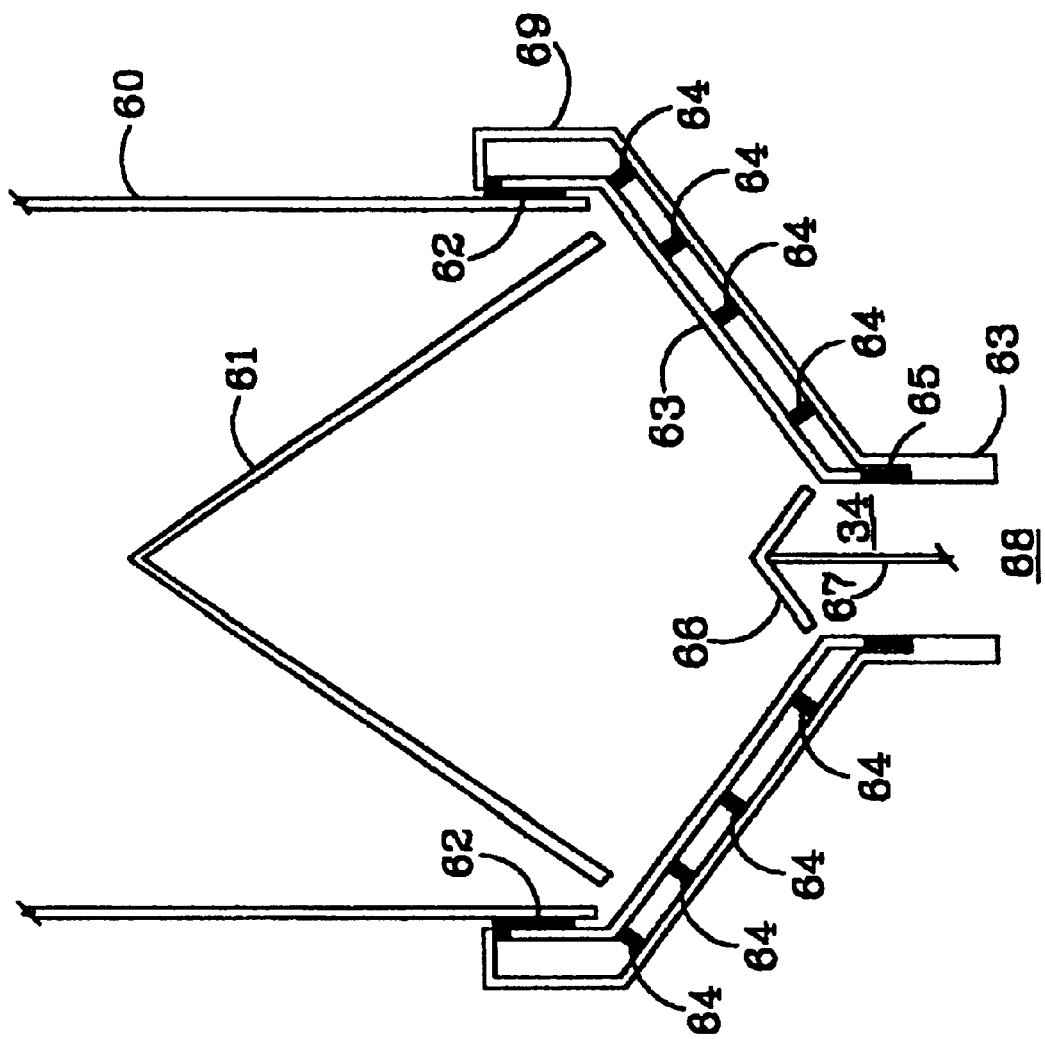
FIG. 9 illustrates the "live-bottom" embodiment of the instant invention for direct use in the bottom of a storage silo.
Figure 10:
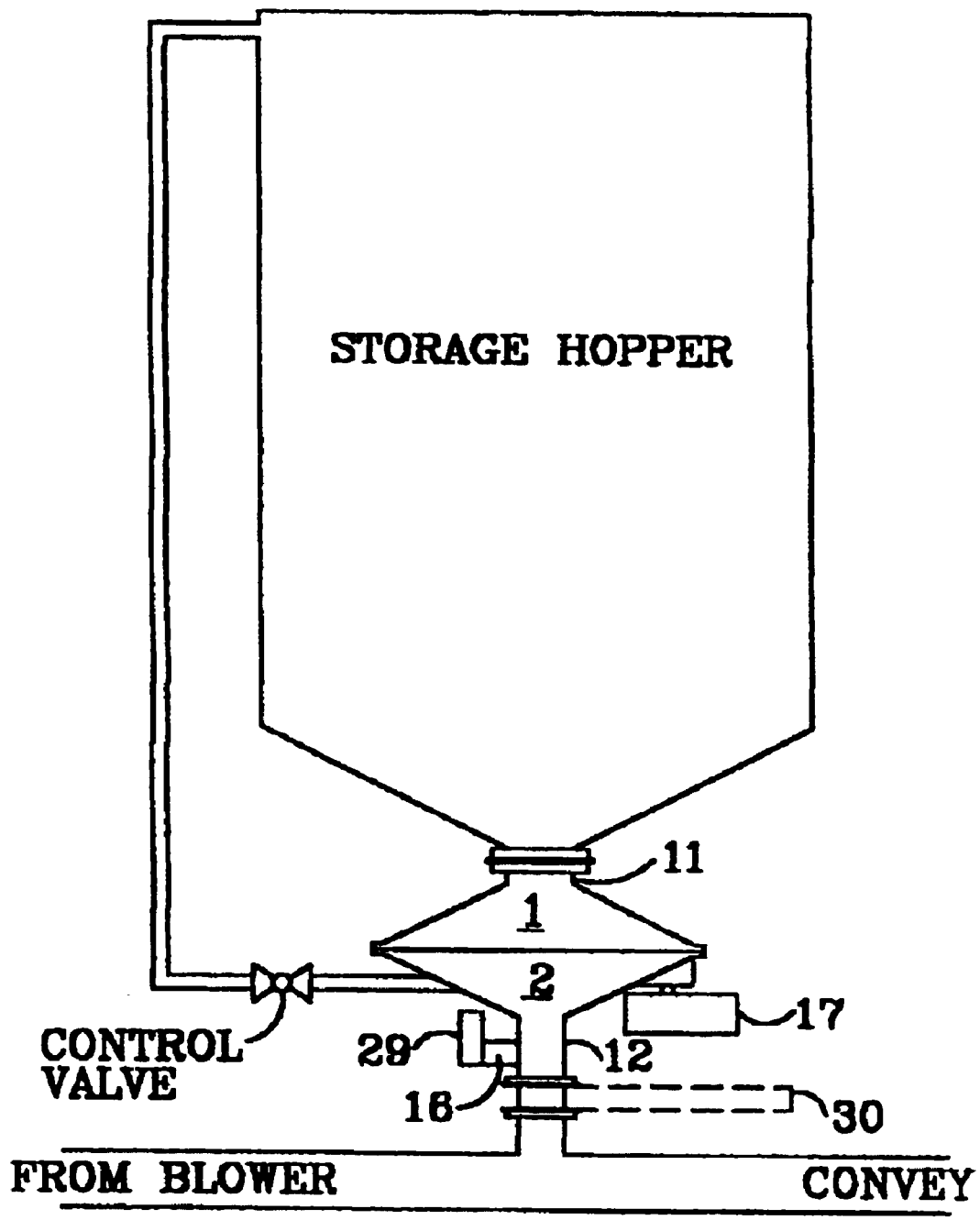
FIG. 10 illustrates a typical installation showing the pressure control of the storage silo and the feeder valve plus certain ancillary components.
Figure 11:
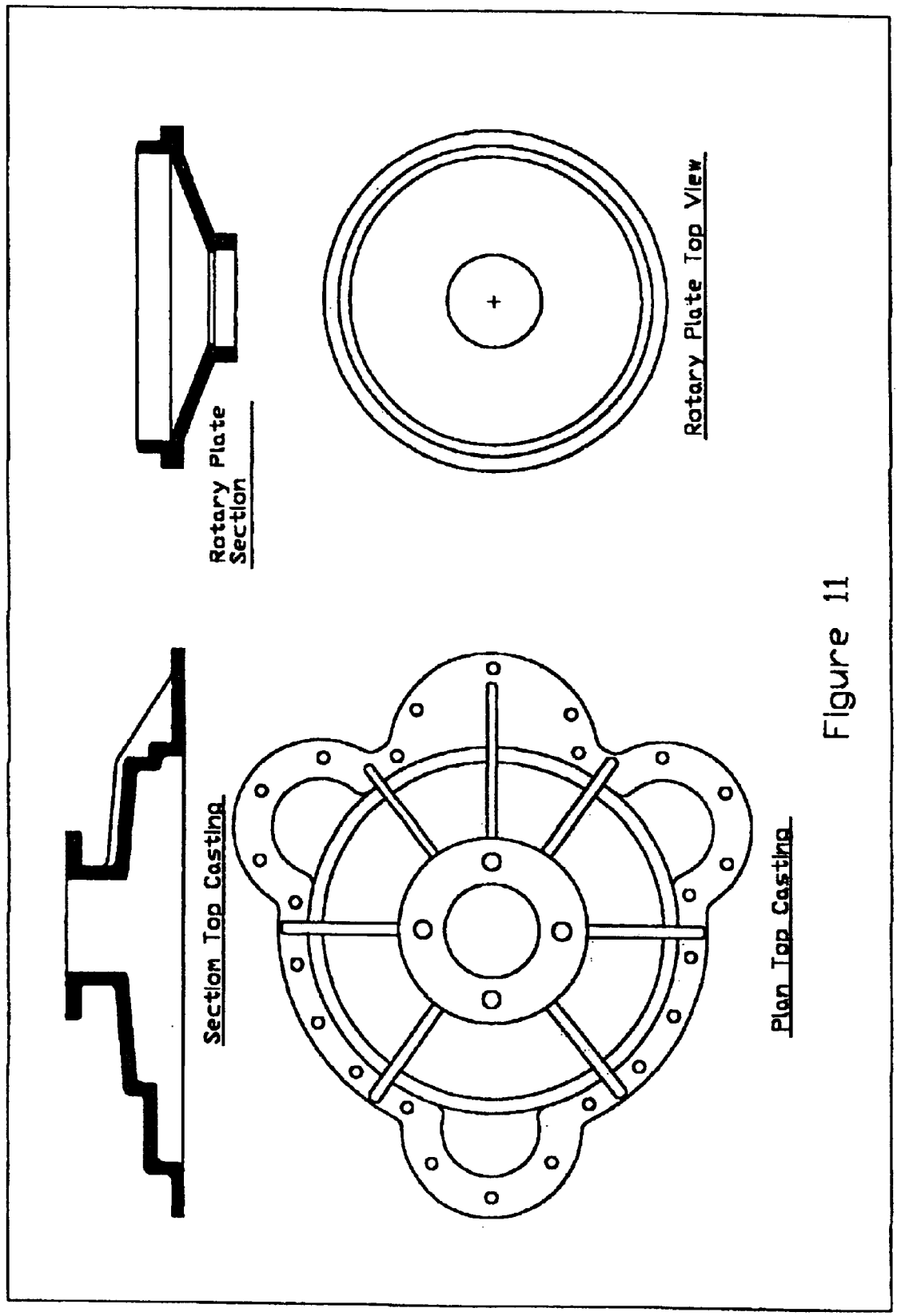
FIG. 11 shows casting details for the upper valve casting of the first embodiment.
Figure 12:
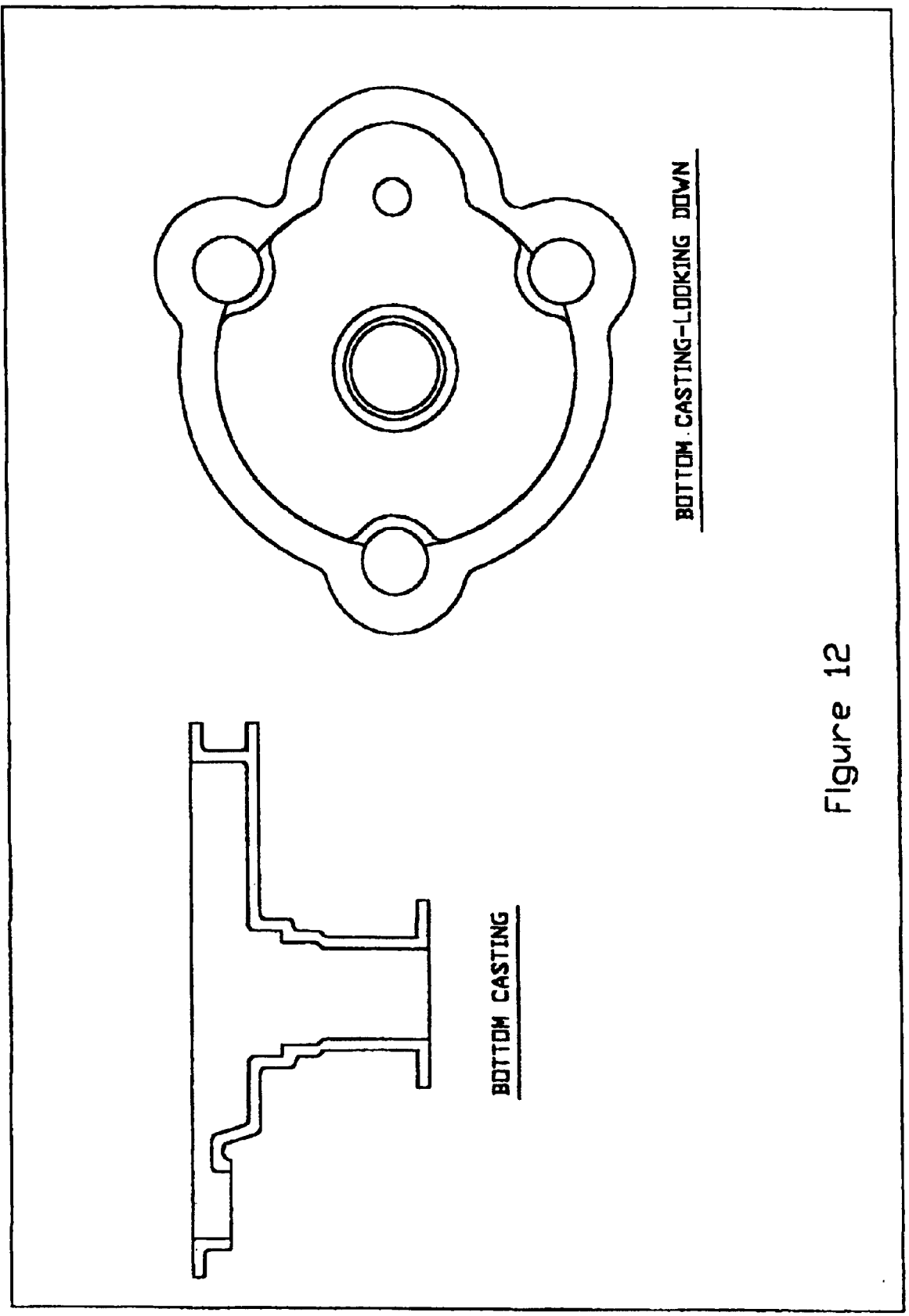
FIG. 12 shows casting details for the lower valve casting of the first embodiment.
Figure 13:
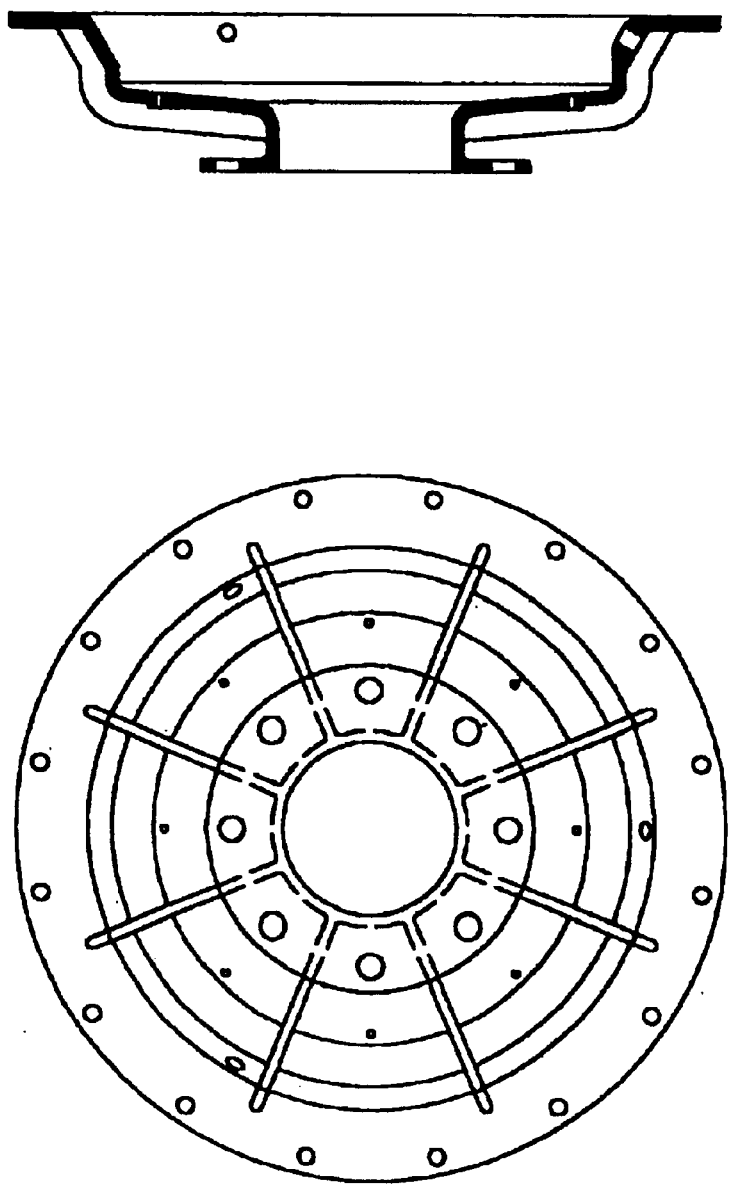
FIG. 13 shows casting details for the upper valve casting of the second embodiment.
Figure 14:
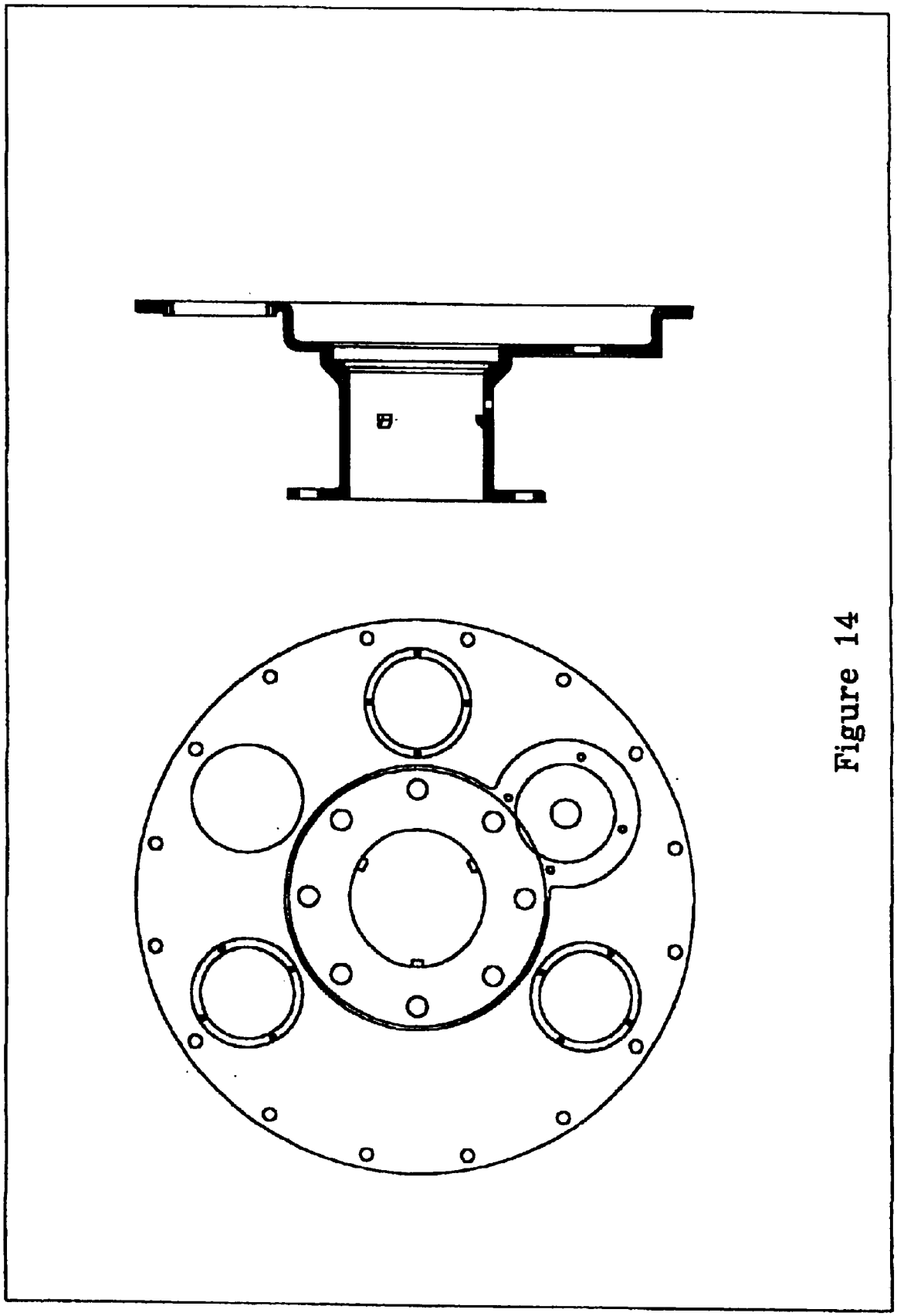
FIG. 14 shows casting details for the lower valve casting of the second embodiment.

FIGS. 1 through 3 are simplified figures illustrating the salient features of the instant invention. FIG. 4 illustrates the salient feature of the inclined support bearing used in the preferred (second) embodiment of the instant invention. FIGS. 5 and 6 show the salient features of the seal arrangement used to pass actuation force to the feed-rate control cone located within the valve. FIGS. 7 and 8 (taken with FIG. 6) show more details on the preferred seal arrangement. FIG. 9 shows the "live-bottom" embodiment of the instant invention; whereas, FIG. 10 shows the device in use in a conveying system. FIG. 10 further shows certain ancillary equipment not shown in other figures. FIGS. 11 and 12 and 13 and 14 are engineering drawings of a prototype casting of the respective first and second embodiments of the instant invention showing a 150# flange on the inlet and discharge ports. The actual valve body of the instant invention is cast (or manufactured) without a flange; however, the body includes a flange mating section. The flange mating section is welded (or otherwise attached) to a suitable flange or coupling to meet the requirements of the user.

Referring to FIGS. 1 through 3, the material to be conveyed or handled, enters the rotary plate valve, through inlet, 11, located in the center of the valve in the upper portion of the upper casing, 1. As shown in FIG. 10, the inlet is connected directly (or through piping) to a storage facility (silo, bin, hopper, bunker or the like). The material drops down onto an inclined rotating plate, 3, and comes in contact with a moveable cone, 9, that is centered over an exit aperture, 34, at the center of the inclined rotary plate.

A controllable speed motor, 17, rotates the rotary plate, 3, mounted within the lower section of the casing, 2, by flange or mounting means 23, thereby driving the solids towards the exit aperture, 34. A vertical shaft assembly, 19, couples power from the motor to the rotary plate via two gears, 18 and 7. Gear 18 is coupled to the motor via shaft 19, and gear 7 is press fitted to the rotary plate, 3, if the rotary plate is made of metal; otherwise, gear 7 is bolted (or otherwise attached) to the plate.

In the first embodiment, shown in FIGS. 1 and 2, the entire rotary plate and associated gear assembly is supported by thrust bearings 6. The thrust bearings are supported within a bearing case, 31, which is an integral part of the lower casing, 2, of the instant device. Vertical positioning of the rotary plate (bearings) is maintained by three horizontal bearings, 32, acting against a skirt, 33, which is formed about the upper section of the rotary plate, 3. The three bearings are positioned equidistant about the upper casting. Inspection ports covered with inspection plates, 24, are located in the lower housing (or casting) immediately below the bearings. Further vertical positioning is obtained by the perimeter seal, 4, acting against the rotary fin, 10, of the rotary plate. (The seal is described in a later paragraph.) In turn the upper fin may also act against the upper housing. The rotary fin and perimeter seal combination keep the product from entering the upper and lower castings. The thrust bearings, 6, are protected by a dust skirt, 8, which is manufactured from a suitable material (see later).

The second and preferred embodiment is shown in FIGS. 3 and 4. In this embodiment vertical support and horizontal positioning is provided by three inclined bearings, 42, acting against a skirt, 43, that is formed in the lower side of the rotary plate at the upper edge. The bearings are positioned equidistant about the upper casing. The lower casing has inspection plates, 44, that cover inspection ports located in the lower casting immediately below the bearings. The embodiment continues to use the thrust bearings, 6, as in first embodiment, but these bearings really act more as a lower seal and a secondary bearing as the load is supported by the three inclined bearings. The thrust bearings, 6, are protected by a dust skirt, 8, which is manufactured from a suitable material (see later). As in the first embodiment, Further vertical positioning is obtained by the perimeter seal, 4, acting against the rotary fin, 10, of the rotary plate. (The seal is described in a later paragraph.) In turn the upper fin may also act against the upper housing. The rotary fin and perimeter seal combination keep the product from entering the upper and lower castings.

It should be noted that the drawings show three bearings which will suffice in the first (non-preferred embodiment); however, it may be necessary to increase the number of bearings in the second (preferred) embodiment based on the weight of the rotary plate and material. A weight distribution cone, as described for the "live-bottom" embodiment (see later) may be employed to reduce the effective weight on plate. These choices are considered standard engineering design decisions and a person skilled in the art may make these determinations.

The bearings are preferentially Ultra High Molecular Weight Polyethylene (UHMWP) sleeves or discs. (Note— other bearing plastic materials would have to be used in high temperature conditions; however, those skilled in the art of materials would have no problem choosing the appropriate material. Under some circumstances, standard sealed roller or ball bearing assemblies would be chosen, but again a person skilled in the art of bearing selection would have no problem in selecting the proper bearing.)

In both embodiments, a perimeter seal, 4, follows the perimeter (or circumference) of the rotary plate and prevents material from leaving the plate. The perimeter seal rests against the fin, 10, of the rotary plate, 3, and is held in place, within by a series of bolts to the inside of the upper casting, 2, as shown in FIGS. 2 through 4. The seal is manufactured from a suitable polyethylene material such as UHMWP (see earlier); however, temperature considerations could readily enter the picture. A normally skilled person can readily determine the choice of the correct material. (For example, a specialty plastic known as FLORISCINT may be used.)

The rotary plate is designed to turn in a clockwise direction (although the same principal would apply to counterclockwise motion with certain modifications to the internals). As the plate rotates in a clockwise direction, material deposited on the plate falls into the discharge port, 12. The quantity of material falling into the discharge port is regulated by:

1) the position of the cone, 9, over the exit aperture, 34, and
2) the speed of rotation, set by the motor.

With careful control of the above parameters the flow (or quantity) of material being conveyed by the conveying system may be regulated.

The valve is divided into two casings or housings, a top, 1, and a bottom, 2. The top casing includes the inlet opening or nozzle, 11, and accepts the perimeter seal, 4. The lower casing can include an inspection ports and plates, 24 or 44, and supports both the rotary plate, 3, and the movable cone, 9.

The preferred movable cone is shown in FIGS. 2 and 6 wherein the cone is moved (or positioned) by an external actuator. The cone, 9, is attached to a shaft, 14, which is held within the discharge throat by a tripod support, 13. The support provides a bearing for the shaft, 14, and positions the cone centrally within the discharge port. As shown in FIG. 2, the shaft is connected to an actuating lever, 15, which passes through a ball seal and pivot assembly, 16. FIGS. 6 through 8 show the preferred ball seal and pivot assembly wherein the actuating lever is shown as item 57.

Referring to FIG. 2, the prototype ball seal and pivot assembly is mounted to the outside of the lower case, 2, as shown. The ball and seal assembly consists of a ball, 20, a seal, 21, a cover plate, 22, and two separable halves 27 and 28. A suitable actuator, shown as 29 in FIG. 10, is coupled to the lever, outside the valve, to operate the cone. The actuator may be hydraulic, pneumatic or electric, as required by the end user.

Referring to FIGS. 6 through 8, the preferred ball seal and pivot assembly is mounted to the outside of the lower case, 2, as shown. The ball and seal assembly consists of a ball, 50, a two-part seal, 51 and 52, a mounting pad 56 that is formed within the lower casing, and a cover plate or retainer, 58, which attaches to the mounting pad. The actuating lever, 57, passes through the ball, and the ball is held in place by pivot pin, 55, which lies within a groove in the retainer, 58.

A suitable actuator, shown as 29 in FIGS. 6 and 10, is coupled to the lever, 57 or 15, outside the valve, to operate the cone. The actuator may be manual, hydraulic, pneumatic or electric, as required by the end user.

An alternate embodiment for the movable cone is shown in FIG. 1. In this embodiment the cone, 9, is directly attached to an internal actuator, 5, that is in turn supported by a support means, 13, within the discharge port of the valve. The internal actuator may be hydraulic, pneumatic, or electric and control lines for the actuator would be brought out of the valve through a suitable port in the bottom (lower) casing.

The two casings are bolted together along a common parting line by flanges 25 and 26. The split casing arrangement allows the entire feeder internal mechanism, and the material being handled, to be maintained under a controlled pressure condition—namely under the same conditions as the conveying system. This is clearly shown in FIG. 10. The arrangement prevents any possible contamination of sensitive products from external sources.

A "live-bottom" embodiment of the instant device is shown in FIG. 9. The "live-bottom" embodiment will eliminate or reduce the effects of "bridging" that often occurs inside a silo when material is transferred from the silo. Essentially, some materials tend to form a cone within the material about the center of the silo when material is withdrawn. Eventually material transfer ceases. The "live-bottom" embodiment is an enlarged version of the instant device wherein the inlet port, 11, becomes the silo.

A simplified "live-bottom" drop plate feeder valve is shown in FIG. 9. The upper casting is in reality the silo, 60, as is the inlet port to the valve. An internal weight distribution cone (non-rotating), 61, should be placed within the silo, attached to the silo walls, to carry the majority of the material dead-weight within the silo. The word "should" is not a limitation, because a cone may not be required in a small silo; whereas, in a large silo a weight distribution cone will be required. A person skilled in the art of material transfer can readily make this type of engineering decision. Material would then flow onto the rotary plate at the edges of the silo and plate. The movement of the plate is transferred up into the material and reduces or eliminates bridging.

FIG. 9 shows a plurality of inclined bearings, 64. These bearings act in the same manner as the inclined bearings described earlier in this disclosure. I.e., the bearings provide vertical load capabilities and horizontal positioning for the rotary plate. The upper perimeter seal, 62, acts in a similar manner as the perimeter seal herein described above as does the lower "thrust" seal, 65. The flow control cone, 66, acts in the same manner as described herein above. An internal or external actuator provides position control in the same manner as herein described above. The required plurality of bearings would be set by standard engineering criteria and may vary from three located at the lower case perimeter to a series of bearings distributed from the perimeter towards the discharge part as shown in FIG. 9.

Not shown in the drawings, within this patent disclosure, are an optional series of low, curved vanes that may be cast or machined on the sloping surface of the rotary plate to influence movement of any material that may tend to stick, or build up on the plate, towards the center discharge opening or port. Likewise and not shown are one or more baffles that may be bolted internally to the upper casings and set a small distance above the rotary plate to prevent any tendency of the sticking material to rotate with the plate. The decision to use these options are pure design decisions that may be made by any person skilled in the art of material transfer with a knowledge of the properties of the material that will pass through the valve.

It is possible to operate the instant device with an atmospheric pressure hopper. The hopper would have to be maintained as full as possible to prevent backflow from the higher-pressure discharge port. However, a discharge port shutdown valve, 30, shown as a dashed-line option in FIG. 10 should be incorporated into a system using the instant device. The shutdown valve would be automatically closed, by an external control system, if and when backflow conditions existed.

The prototype valve was manufactured using standard aluminum casting techniques. Thus, the preferred material for the valve casings is cast aluminum. Under some circumstances, this type of material might not be appropriate, and the manufacturer (or end user) would use a different material such as cast iron, bronze, etc. Small versions of the device may be machined from stainless steel or plastic (and plastic molding techniques may be utilized). Again, a person skilled in the art would be able to make the proper choice of material and manufacturing to meet the circumstances.

In the preferred embodiment, the discharge and inlet openings are manufactured with flange mating sections. The flange mating section is mated to flange types specified by the end user. This allows for a series of valve bodies to be manufactured, which can be mated to various, and different sized flanges; thus, reducing the valve body inventory and end cost to the user.

Some discussion has been undertaken on materials for seals and dust skirts and will be expanded. In general, the seals/dust skit may be fabricated from a number of polymers or metallocenes. The final selection of material would depend on the physical characteristics and temperature of the product to be conveyed. Extremely rough or abrasive materials may even require seals/dust skirt of bronze or one of the silicon carbide materials. For a conveyed product such as some of the ores of copper, lead, molybdenum, or shale or clay, the seals/dust skirt may well be made of maple, oak, or other dense hard wood. A person of reasonable skill in the art should have little problem in making the correct selection.

Now it should be noted that the design of the valve does not envision a rubbing surface. I.e., material should never enter the gap (¹⁄₁₆-inch or 0.159 cm) between the perimeter seal, 4, and the fin, 10. Similarly, material should not enter the gap between the dust skirt, 8, and the stationary lower casing, 2 (also approximately ¹⁄₁₆-inch or 0.159 cm).

The rotary plate may be fabricated from cast iron, if iron contamination is not a problem. A plate of chilled cast iron, chrome plated, would be suitable for most mildly abrasive and/or corrosive materials or if iron contamination is a consideration. The plate may also be manufactured from one of the stainless alloys, if corrosion or contamination is a consideration. In the case of really abrasive material, the plate should be made of NIHARD or NYRESIST.

In the most serve condition, such as high tonnage feeders, the plate would be fabricated from cast iron as the base. The base would then be overlaid (as would other sections within the valve) with manganese steel plates manufactured in segments. The segments would be replaced, during regular maintenance, if and when worn.

What has been disclosed is a rotary plate feeder that overcomes the disadvantages of the current art star feeders and offset plate feeders. The instant invention, because it has no close clearances, will not damage the material being handled. In a similar manner, abrasive products will cause little wear in the valve and, likewise, lumpy products cannot jamb the feeder valve. Because there are no close metal-to-metal clearances, delicate products such as seed and drugs can be handled without damage.

The art contained within the instant invention will reduce total air loss in a pneumatic conveying system when compared to the standard star valve, and horsepower requirements will be substantially reduced because the metal-to-metal clearances, found in star valves, are not found in the instant invention. As can be expected, valve reliability is superior, and maintenance is easier and less expensive because no element within the invention can bind or drag. Because of the lack of interference between machine parts and the lack of product binding and drag, the instant invention will have superior wear and service characteristics when compared to current art valves. Finally, as has been explained, the device is easily controlled from a central control room.

The choice of preferred materials for the parts forming the instant device has been given within this disclosure; however, as stated in the disclosure certain operating conditions will control the choice. For example, both inclined and horizontal bearing may be employed with heavy lumpy materials that would cause the inclined bearing embodiment to wobble about the center axis and banging into the perimeter seal. A person skilled in the art of material selection would have little problem in making a proper choice; therefore, changes in material, size, mating flanges, and the like are deemed to fall within the scope of this disclosure. Thus the possibilities are almost endless in adapting the instant device to serve in any situation.

I claim:

1. A drop plate feeder for use in solids handling systems comprising:

an upper case having an upper portion and a lower portion and having a lower circumference extending about said lower portion said lower circumference having an inside and an outside;

a lower case having an upper section and a lower section;

an inclined rotary plate having a circumference, a center, a top side and a bottom side;

an inlet port integrally centered within said upper case extending from above said upper portion of said upper case towards said bottom portion of said upper case for depositing solids on said inclined rotary plate;

a discharge port integrally centered within said lower case said discharge port extending down and away from said lower section for transferring solids to a conveying system;

bearing means for supporting said inclined rotary plate within said lower case;

means for rotating said inclined rotary plate;

an exit aperture located at said center of said inclined rotary plate and extending between said top side and said bottom side of said inclined rotary plate such that said exit aperture is centered directly over said discharge port;

a feed-rate control cone centered over said exit aperture;

means for positioning said feed-rate control cone between a point wherein said cone rests on said inclined rotary plate and a point wherein said cone is suspended above said inclined rotary plate whereby the movement of solids from said plate through said exit aperture and through said discharge port is varied from minimum to maximum; and, wherein said upper case and said lower case are joined together.

2. The apparatus of claim 1 further comprising:

a perimeter seal riding on said circumference of said rotary inclined plate and sealing between said rotary inclined plate and said inside of said lower circumference of said upper case.

3. The apparatus of claim 2 wherein said lower case has an upper circumference extending about said upper section further comprising:

a lower flange circumferentially formed to said outside of said lower circumference of said upper case;

an upper flange circumferentially formed to said outside of said upper circumference of said lower case;

wherein said upper case and said lower case are joined together by mating said flanges.

4. The apparatus of claim 1 wherein said discharge port has an upper end, said lower case has an upper circumference extending about said upper section and a thrust bearing housing collocated within the discharge port at said upper end thereof, wherein said inclined plate has a horizontal bearing skirt extending about said circumference of said inclined rotary plate and wherein said bearing means for supporting said inclined rotary plate within said lower case further comprises;

a plurality of horizontal bearings located equidistant about said upper circumference and attached to said lower case whereby said horizontal bearing skirt rides against said bearings thereby stabilizing the horizontal rotation of said inclined plate;

a set of thrust bearings located within said thrust bearing housing upon which said inclined rotary inclined plate rests thereby stabilizing the vertical rotation of said inclined plate.

5. The apparatus of claim 4 further comprising:

a dust skirt capable of effecting a seal between said thrust bearings and said discharge port.

6. The apparatus of claim 1 wherein said means for positioning said feed-rate control cone further comprises:

an internal actuator mounted within the discharge port.

7. The apparatus of claim 1 wherein said lower case has an outside and wherein said means for positioning said feed-rate control cone further comprises:

a feed-rate cone position lever having a first end and a send end and passing through a ball seal mounted to said outside of said lower case;

an external actuator mounted to said outside of said lower case and attached to said first end of said feed-rate position control lever;

a feed-rate cone position rod attached to said feed-rate cone and to said second end of said feed-rate cone position lever;

whereby said actuator transfers vertical movement to said feed-rate control cone thereby positioning said feed-rate control cone between said points.

8. The apparatus of claim 1 wherein said lower case has an upper circumference extending about said upper section and wherein said inclined plate has an inclined bearing skirt extending about said circumference of said inclined rotary plate and wherein said bearing means for supporting said inclined rotary plate within said lower case further comprises;

a plurality of inclined bearings located equidistant about said upper circumference and attached to said lower case whereby said inclined bearing skirt rides against said bearings thereby stabilizing both the vertical and horizontal rotation of said inclined plate.

9. The apparatus of claim 8 further comprising:

a dust skirt capable of effecting a seal between said exit aperture of said inclined rotary plate and said discharge port.

10. The apparatus of claim 1 wherein said discharge port has an upper end, said lower case has an upper circumference extending about said upper section and a thrust bearing housing collocated within the discharge port at said upper end thereof, wherein said inclined plate has an inclined bearing skirt extending about said circumference of said inclined rotary plate and wherein said bearing means for supporting said inclined rotary plate within said lower case further comprises;

a plurality of inclined bearings located equidistant about said upper circumference and attached to said lower case whereby said inclined bearing skirt rides against said bearings thereby stabilizing both the vertical and horizontal rotation of said inclined plate;

a set of thrust bearings located within said thrust bearing housing upon which said inclined rotary inclined plate rests thereby stabilizing the vertical rotation of said inclined plate.

11. The apparatus of claim 10 further comprising:

a dust skirt capable of effecting a seal between said thrust bearings and said discharge port.

12. A drop plate feeder for use in solids handling systems comprising:

an upper case having an upper portion and a lower portion and having a lower circumference extending about said lower portion said lower circumference having an inside and an outside;

a lower case having an upper section and a lower section and having an upper circumference extending about said upper section said upper circumference having an outside;

an inclined rotary plate having a circumference, a center, a top side and a bottom side;

an inlet port integrally centered within said upper case extending from above said upper portion of said upper case towards said bottom portion of said upper case for depositing solids on said inclined rotary plate;

a discharge port integrally centered within said lower case said discharge port extending down and away from said lower section for transferring solids to a conveying system;

an exit aperture located at said center of said inclined rotary plate and extending between said top side and said bottom side of said inclined rotary plate such that said exit aperture is centered directly over said discharge port;

a plurality of inclined bearings located equidistant about said upper circumference and attached to said lower case whereby said inclined bearing skirt rides against said bearings thereby stabilizing both the vertical and horizontal rotation of said inclined plate;

a feed-rate control cone centered over said exit aperture on said inclined rotary plate;

an actuator mounted within said discharge port;

whereby said actuator transfers vertical movement to said feed-rate control cone thereby positioning said feed-rate control cone between a point wherein said cone rests on said inclined rotary plate and a point wherein said cone is suspended above said inclined rotary plate whereby the movement of solids from said plate through said exit aperture and through said discharge port is varied from minimum to maximum;

means for rotating said inclined rotary plate; and, wherein said upper case and said lower case are joined together.

13. A drop plate feeder for use in solids handling systems comprising:

an upper case having an upper portion and a lower portion and having a lower circumference extending about said lower portion said lower circumference having an inside and an outside;

a lower case having an upper section and a lower section and having an upper circumference extending about said upper section said upper circumference having an outside;

an inclined rotary plate having a circumference, a center, a top side and a bottom side;

an inlet port integrally centered within said upper case extending from above said upper portion of said upper case towards said bottom portion of said upper case for depositing solids on said inclined rotary plate;

a discharge port integrally centered within said lower case said discharge port extending down and away from said lower section for transferring solids to a conveying system;

an exit aperture located at said center of said inclined rotary plate and extending between said top side and said bottom side of said inclined rotary plate such that said exit aperture is centered directly over said discharge port;

a plurality of inclined bearings located equidistant about said upper circumference and attached to said lower case whereby said inclined bearing skirt rides against said bearings thereby stabilizing both the vertical and horizontal rotation of said inclined plate;

a feed-rate control cone centered over said exit aperture on said inclined rotary plate;

a feed-rate cone position lever having a first end and a send end and passing through a ball seal mounted to said outside of said lower case;

an external actuator mounted to said outside of said lower case and attached to said first end of said feed-rate position control lever;

a feed-rate cone position rod attached to said feed-rate cone and to said second end of said feed-rate cone position lever;

whereby said actuator transfers vertical movement to said feed-rate control cone thereby positioning said feed-rate control cone between a point wherein said cone rests on said inclined rotary plate and a point wherein said cone is suspended above said inclined rotary plate whereby the movement of solids from said plate through said exit aperture and through said discharge port is varied from minimum to maximum;

means for rotating said inclined rotary plate; and, wherein said upper case and said lower case are joined together.

14. The apparatus of claim 13 further comprising:

a dust skirt capable of effecting a seal between said exit aperture of said inclined rotary plate and said discharge port; and a perimeter seal riding on said circumference of said rotary inclined plate and sealing between said rotary inclined plate and said inside of said lower circumference of said upper case.

15. The apparatus of claim 13 wherein said discharge port has an upper end, said lower case has a thrust bearing housing collocated within the discharge port at said upper end thereof and further comprising:

a set of thrust bearings located within said thrust bearing housing upon which said inclined rotary inclined plate rests thereby additionally stabilizing the vertical rotation of said inclined plate; and, a dust skirt capable of effecting a seal between said thrust bearings and said discharge port.

16. A live bottom feeder for use in solids handling systems comprising:

a silo having a bottom end and having a bottom circumference extending about said bottom end;

a lower case having an upper section and a lower section and having an upper circumference extending about said upper section said upper circumference having an outside and an inside;

an inclined rotary plate having a circumference, a center, a top side, and a bottom side said silo capable of depositing solids on said inclined rotary plate;

a discharge port integrally centered within said lower case said discharge port extending down and away from said lower section for transferring solids to a conveying system;

an exit aperture located at said center of said inclined rotary plate and extending between said top side and said bottom side of said inclined rotary plate such that said exit aperture is centered directly over said discharge port;

a plurality of inclined bearings located equidistant between said upper circumference and said discharge port and attached to said lower case whereby said inclined rotary plate rides against said plurality of bearings thereby stabilizing both the vertical and horizontal rotation of said inclined plate;

a feed-rate control cone centered over said exit aperture;

means for positioning said feed-rate control cone between a point wherein said cone rests on said inclined rotary plate and a point wherein said cone is suspended above said inclined rotary plate whereby the movement of solids from said plate through said exit aperture and through said discharge port is varied from minimum to maximum;

means for rotating said inclined rotary plate; and, wherein said lower case is attached to said silo.

17. The apparatus of claim 16 further comprising:

a dust skirt capable of effecting a seal between said exit aperture of said inclined rotary plate and said discharge port; and a perimeter seal riding on said circumference of said rotary inclined plate and sealing between said rotary inclined plate and said bottom circumference of said silo.

18. The apparatus of claim 16 wherein said means for positioning said feed-rate control cone further comprises:

an internal actuator mounted within the discharge port.

19. The apparatus of claim 16 wherein said lower case has an outside and wherein said means for positioning said feed-rate control cone further comprises:

a feed-rate cone position lever having a first end and a send end and passing through a ball seal mounted to said outside of said lower case;

an external actuator mounted to said outside of said lower case and attached to said first end of said feed-rate position control lever;

a feed-rate cone position rod attached to said feed-rate cone and to said second end of said feed-rate cone position lever;

whereby said actuator transfers vertical movement to said feed-rate control cone thereby positioning said feed-rate control cone between said points.

20. The apparatus of claim 16 further comprising a weight distribution cone mounted to said bottom end of said silo immediately above said inclined rotary plate for relieving the direct weight of the solid contained within said silo from said inclined rotary plate.

* * * * *